United States Patent
Gueorguiev et al.

(10) Patent No.: US 12,039,516 B2
(45) Date of Patent: *Jul. 16, 2024

(54) SECURE PAYMENT TRANSACTIONS

(71) Applicant: PHOS SERVICES LTD, London (GB)

(72) Inventors: Ivo Alexandrov Gueorguiev, London (GB); Diyan Stefanov Nedelchev, Burgas (BG); Antonina Ivanova Martinova, Sofia (BG)

(73) Assignee: PHOS SERVICES LTD, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,450

(22) Filed: Jul. 14, 2022

(65) Prior Publication Data
US 2022/0351183 A1 Nov. 3, 2022

Related U.S. Application Data (63) Continuation of application No. 16/917,850, filed on Jun. 30, 2020, now Pat. No. 11,397,940, which is a continuation-in-part of application No. 16/491,580, filed as application No. PCT/BG2017/000004 on Mar. 15, 2017.

(51) Int. Cl.
| | |
|---|---|
| *G06Q 20/32* | (2012.01) |
| *G06Q 20/02* | (2012.01) |
| *G06Q 20/38* | (2012.01) |
| *G06Q 20/40* | (2012.01) |

(52) U.S. Cl.
CPC ....... *G06Q 20/3278* (2013.01); *G06Q 20/027* (2013.01); *G06Q 20/38215* (2013.01); *G06Q 20/3829* (2013.01); *G06Q 20/4012* (2013.01); *G06Q 2220/00* (2013.01)

(58) Field of Classification Search
CPC ............. G06Q 20/3278; G06Q 20/027; G06Q 20/38215; G06Q 20/3829; G06Q 20/4012
USPC ............................................. 705/44
See application file for complete search history.

(56) References Cited

U.S. PATENT DOCUMENTS

2015/0019443 A1* 1/2015 Sheets .................. G06Q 20/322
705/71
2016/0063498 A1 3/2016 Li

FOREIGN PATENT DOCUMENTS

WO 2016033677 * 3/2016 ............. G06Q 20/32
WO 2016033677 A1 3/2016

* cited by examiner

*Primary Examiner* — Hai Tran
(74) *Attorney, Agent, or Firm* — HORIZON IP PTE LTD (57) ABSTRACT

A client comprising an application for secure payment transactions is provided. The application runs on a personal mobile communication device and the client accesses a service provided by a server, which includes a payment gateway. Various security measures are included in the client-server communication related to executing payment transactions in a secure environment.

20 Claims, 5 Drawing Sheets

SECURE PAYMENT TRANSACTIONS

CROSS-REFERENCE TO RELATED APPLICATIONS

This application is a continuation of co-pending U.S. patent application Ser. No. 16/917,850, filed Jun. 30, 2020, entitled "Secure Payment Transactions", which claims the benefit of European Patent Application No. EP19184193.1, filed on Jul. 3, 2019, and is a continuation-in-part of co-pending U.S. patent application Ser. No. 16/491,580, filed on Sep. 6, 2019, which is a 371 US national application of PCT International Application Ser. No. PCT/BG2017/000004, filed on Mar. 15, 2017. The disclosures of all of which are herein incorporated by reference in their entirety for all purposes.

TECHNICAL FIELD

The following description relates to a client, a server and a method for implementing secure payment transactions using a personal mobile communication device in the absence of additional external hardware, such as Point-of-Sale (POS) terminals.

BACKGROUND

The development of plastic payment cards necessitated the presence of specialized hardware to accept payments. The electronic POS devices are used in retail for performing such electronic payments. These devices are typically hardware devices provided by the payment processing entities. Some of the POS devices require a wired connection to banks and are used for processing payments only. Even the advanced POS devices, which may have additional functionalities, still require additional hardware.

The recent tendencies aim at allowing merchants to accept payments from contactless cards through mobile smart phones or other personal mobile communication devices without the need for additional or modification of the existing hardware. Payments can be accepted on any mobile smart phone or another personal mobile communication device (tablet, computer, etc) if it has the necessary characteristics. For example, different communication interfaces, such as NFC®, FeliCa® could be utilized for the communication with the contactless cards. There is no need for additional or modification of the existing hardware in the personal mobile communication devices. However, the use of a personal mobile communication device presumes much higher security measures compared to the stand-alone POS devices.

Related work in the area is provided as follows. Ian LO (WO 2016/033677 A1) describes "Systems and methods for implementing a Point-of-Sale device using a smartphone or tablets without hardware add-ons. The smartphone-based system accepts card payments through the mobile device by either tapping a Near Field Communication (NFC) enabled payment card to the device or by using the device's other features such as its camera to read a card's number or a keyboard to manually input a card's information.

There is a need to provide a secure environment for such payments performed through personal mobile communication devices. The problem is solved by the subject matter of the independent claims. Preferred embodiments are defined in the dependent claims.

SUMMARY

An embodiment of the disclosure relates to a personal mobile communication device including a secured storage, a communication interface, and a processor. The processor runs a client for performing payment transactions on the personal mobile communication device. The client is configured to store in the secured storage a private key, wherein the private key is the private key of a private-public key pair, and an encrypted device key from a terminal management server in response to an attestation request, wherein the encrypted device key using a public key which is the public key of the private-public key pair. The client is also configured to read a contactless card related to the payment request by the communication interface in response to a payment transaction request, and send payment information of the payment transaction request to a payment gateway of the terminal management server for processing by a card processor. The payment information is encrypted with an unencrypted device key derived from decrypting the encrypted device key using the private key. The client is also configured to receive an approval response from the payment gateway if the payment transaction request is approved by the card processor for execution of the payment transaction request and receive a renewed last transaction token from the payment gateway, the renewed transaction token replaces the last transaction token, the renewed transaction token serves as the last transaction token for a subsequent payment transaction.

In another embodiment, the disclosure relates to a method for performing payment transactions on a personal mobile communication device. The method includes storing a private key in a secured storage of the personal mobile communication device, wherein the private key is the private key of a private-public key pair. The method also includes storing an encrypted device key in the secured storage of the personal mobile communication device, the encrypted device key is from a terminal management server in response to an attestation request, wherein the encrypted device key is encrypted using a public key which is the public key of the private-public key pair. The method further includes reading a contactless card used for a payment transaction request in response to the payment transaction request by a communications interface of the personal mobile communication device. The method also includes sending, by the personal mobile communication device, payment information of a payment transaction request to a payment gateway of the terminal management server for processing by a card processor, wherein the payment information is encrypted with an unencrypted device key derived from decrypting the encrypted device key using the private key; and receiving an approval response for execution of the payment transaction from the payment gateway if the card processor approves the payment transaction request. The method further includes receiving a renewed last transaction token from the payment gateway, and the renewed last transaction token serves as the last transaction token for a subsequent payment transaction request.

In yet another embodiment, the disclosure relates to a method for manage secure payment transactions by a terminal management server including registering a mobile communication device ID of a personal mobile communication device including a client an application for secured payment transactions and login credentials associated with the mobile communication device ID and generating a device key and sending the device key encrypted with the public key (encrypted device key) to the client upon attestation of the mobile communication device. The method also includes sending an authorization session token to the client upon logging in by the client and receiving payment information from the client for a payment transaction request for processing, wherein the payment information is encrypted with the device key after decrypting the encrypted device key using the private key. The method further includes decrypting the received payment information and checking the received payment information for the authorization session token and a last transaction token and sending the payment information for processing to a card processor after confirming a match of the authorization session token and last transaction token. The method also includes receiving an approval response approving the payment transaction request and sending the approval response to the client with a notification for execution of the payment transaction request. The method further includes generating and sending a renewed last transaction token to the client, the renewed last transaction token serves as the last transaction token for a subsequent payment transaction request from the client.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

A detailed description of examples will be provided with reference to the drawings. It should be understood, however, that various modifications to the examples may be made. Unless explicitly indicated otherwise, elements of one example may be combined and used in other examples to form new examples.

Figure 1:
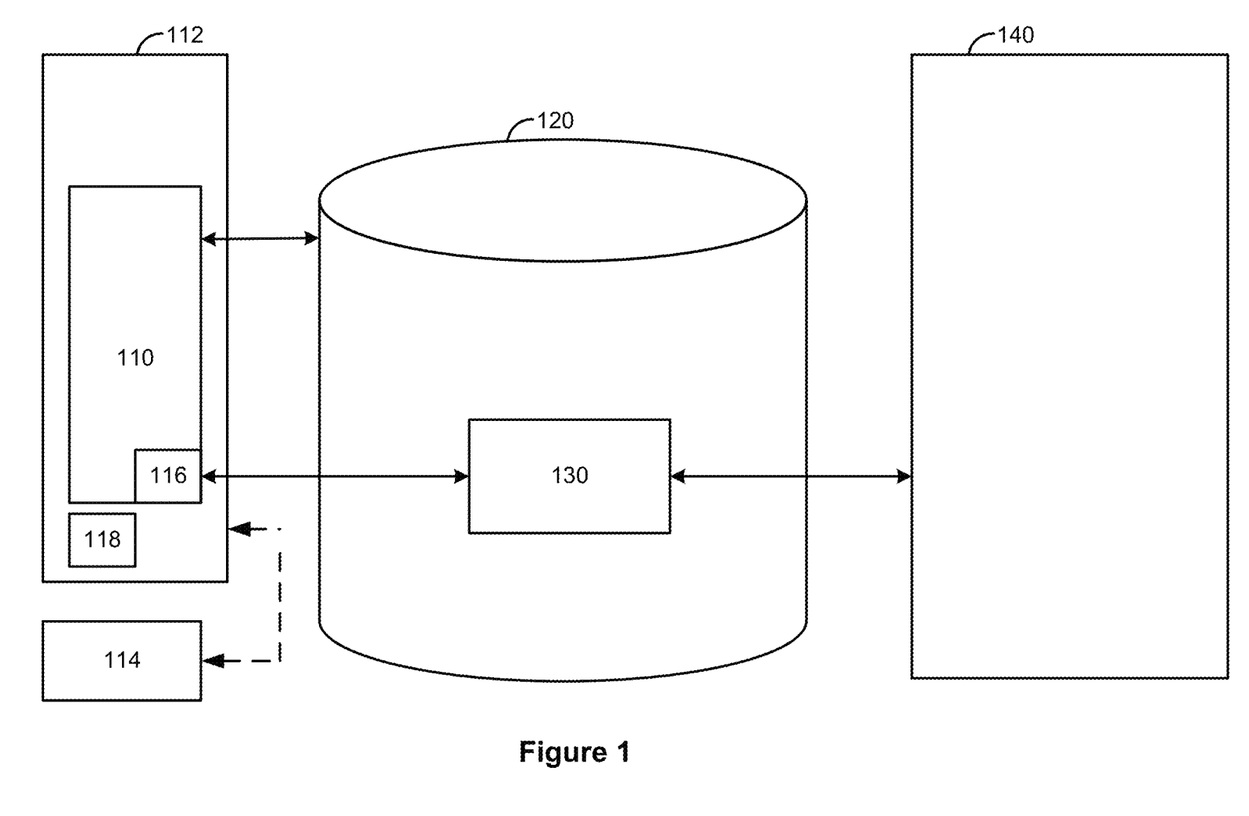
FIG. 1 shows an example of a system diagram for secure payment transactions.

FIG. 1 depicts a system for secure payment transactions. The system includes a client 110, a terminal management server (TMS) 120, and a card processor 140. The client 110 may include an application for secure payment transactions (ASPT) 116, which runs on a personal mobile communication device (PMCD) 112.

A client, such as client 110, is a piece of computer hardware or software that may access a service made available by another piece of computer hardware or software called server (e.g. TMS 120). A client may be or comprise a software application or application in short, which is a set of operations for a computer to perform and designed to fulfill a specific function directly for the user or another application.

The client 110 performs secure payment transactions by means of its own instructions and the functionalities of the PMCD 112, on which it is run. A PMCD may be any kind of mobile communication device, such as a smart phone a tablet, etc. The term "personal" is intended to distinguish a PMCD from an ordinary POS terminal. The communication interfaces of the PMCD may be utilized to substitute the known in the art POS terminals. A secure storage (SS) 118 of the PMCD 112 may be used to store any sensitive data.

The terminal management server (TMS) 120 provides secure payment transactions for the client 112. In order to provide initially access to the client 112, the TMS registers a mobile communication device ID respective to a PMCD 112, and also login credentials to be associated with the mobile communication device ID.

Upon initial sign-up in the ASPT 116, the client 110 generates a public and a private key pair. These keys are a part of asymmetric encryption that encodes information. A message sender encrypts the message with the public key and the receiver decrypts it with the private key. Public and private key pair helps to encrypt information that ensures data is protected during transmission.

The generated private key is stored in a SS 118 on the PMCD 112. The secure storage 118 may be a hardware secure storage according to one embodiment or a software secure storage, according to another embodiment.

An attestation request that follows the initial sign-up allows a trusted device (e.g. here the PMCD 112) to present reliable evidence to remote parties (e.g. here the TMS 120) about the ASPT 116. In one embodiment, the attestation request includes the public key generated previously, wherein the public key is signed with an application certificate thus providing evidence about the origin of the APST 116 on the PMCD 112. Ensuring that the provided public key is signed with the trusted certificate, this public key is used to encrypt a device key, which is sent back encrypted from the TMS 120 to the client 110. The received device key is stored encrypted in a secure storage 118 on the PMCD 112.

In one embodiment, the attestation request may also include a mobile communication device ID and login credentials. Login credentials are used for identification. They usually consist of a user ID and password. A mobile communication device ID is a unique ID for a particular PMCD and together with the application certificate provide reliable evidence that the login credentials are coming from a trusted PMCD and client respectively.

When there is an intent on user's end to perform a payment through the client 110, then log-in is performed and an authorization session token from the terminal management server 120 is received.

Then, a request for payment transaction is received at the APST 116. In order to initiate the payment, a contactless card 114 is read by the application for secure payment transactions 116 using a communication interface of the PMCD 112. In one embodiment, the communication interface is Near Field Communication, adopted to get the card data upon tapping the contactless card 114 on the PMCD 112 when requested to.

Further, the client 110 sends payment information to a payment gateway 130 of the terminal management server 120 for processing, wherein the payment information comprises payment data, contactless card data, the authorization session token and last transaction token, and wherein the payment information is encrypted with the device key, and wherein the device key is decrypted using the private key prior to being used for encrypting the payment information. A payment gateway, such as payment gateway 130, is a merchant service provided by an e-commerce application service provider that authorizes card payments. The payment data includes amount of the transaction and information for the involved parties in the transaction. The contactless card data includes data for identification of the card being used for paying the transaction.

The last transaction token is a token generated during a previous successful transaction from the application for secure payment transactions 116 run on PMCD 112.

The number of tokens and encryptions ensure a secure environment for the initiated payment regarding all the involved sensitive data in the payment information.

In one embodiment, the client 110 is further configured to receive one or more PIN certificates from the terminal management server 120 upon attestation and store the one or more PIN certificates in the secure storage 118. The PIN certificates are used for additional security measure in case a transaction amount is beyond a predefined limit. In such case the payment information further includes a PIN block data and the PIN block data comprises a PIN associated with the contactless card 114, the PIN encrypted with a certificate from the one or more PIN certificates respective to an issuer of the contactless card 114.

After the payment information is sent to the payment gateway 130, the payment information is deleted from the application for secure payment transaction 116, which is run on the PMCD 112.

TMS 120 decrypts the received payment information through its payment gateway 130 and checks the authorization session token and the last transaction token by comparing if they are the valid ones and upon match of the tokens, TMS 120 (through its payment gateway 130) sends the payment information for processing to a card processor 140.

The card processor 140 either approves the payment transaction or rejects it. An approval triggers the payment gateway 130 to send a response to the client 110 for execution of the payment transaction, following generation of a renewed last transaction token, sending the renewed last transaction token to the client 110 and substituting the last transaction token with the renewed one for subsequent transactions.

A rejection of the payment transaction by the card processor 140 triggers the payment gateway 130 to send a response with a notification for a rejection to the client 110.

Figure 2A:
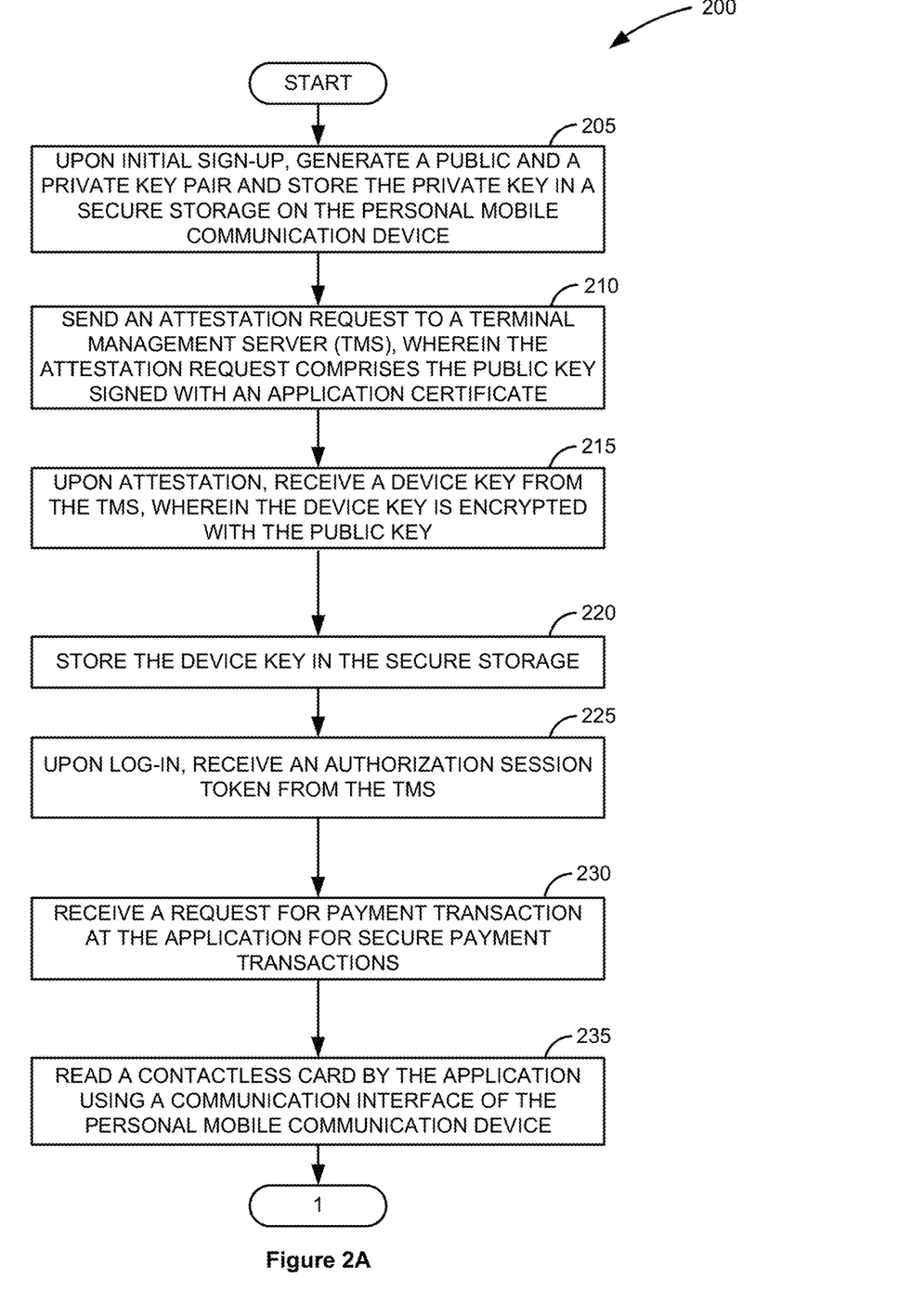
FIGS. 2A and 2B show a flow diagram of a method for secure payment transactions.
Figure 2B:
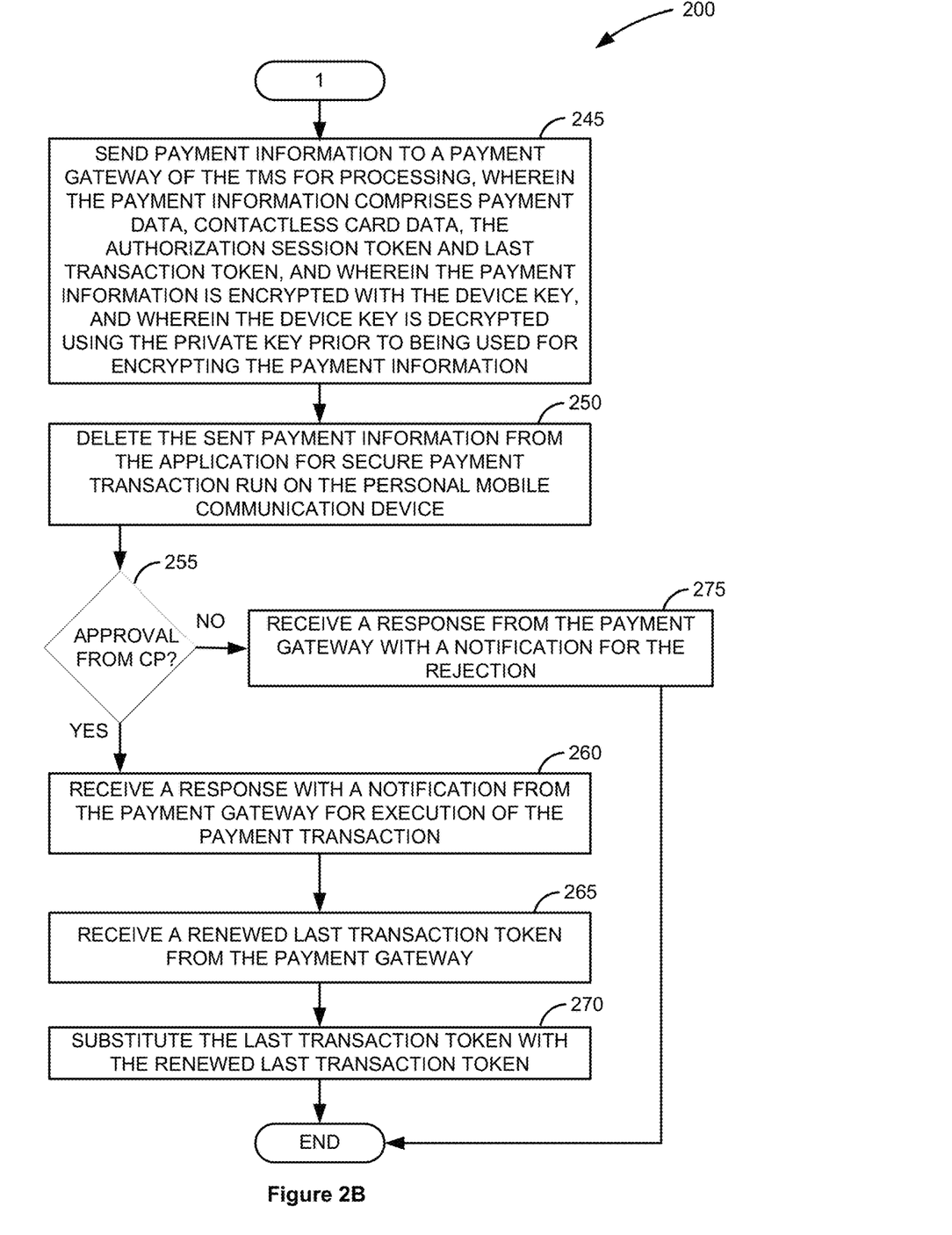

FIGS. 2A and 2B show a flow diagram 200 of a method for secure payment transactions. The method may include running by a client 110, an application for secure payment transactions 116 on a personal mobile communication device 112.

At 205, upon initial sign-up, a public and a private key pair are generated, and the private key is stored in a secure storage 118 on the PMCD 112.

At 210, an attestation request is sent to a TMS 120. The attestation request comprises the public key signed with an application certificate.

At 215, upon attestation, a device key is received from the TMS 120. The device key is encrypted with the public key.

At 220, the device key is stored in the secure storage 118.

At 225, upon log-in, an authorization session token is received from the TMS 120.

At 230, a request for payment transaction is received at the application for secure payment transactions 116.

At 235, a contactless card 114 is read by the ASPT 116 using a communication interface of the PMCD 112.

At 245, payment information is sent to a payment gateway 130 of the TMS 120 for processing. The payment information includes payment data, contactless card data, the authorization session token and last transaction token. The payment information is encrypted with the device key, which is decrypted using the private key prior to being used for encrypting the payment information.

At 250, the sent payment information is deleted from the ASPT 116 run on the PMCD 112.

At 255, a check is performed, whether a card processor (CP) 140, approves the payment transaction. If card processor 140 approves the payment transaction at 255, then at 260, a response is received with a notification from the payment gateway 130 for execution of the payment transaction. The approved transaction also triggers receiving, at 265, a renewed last transaction token from the payment gateway 130 and, at 270, the last transaction token is substituted with the renewed last transaction token.

If card processor 140 rejects the payment transaction at 255, then, at 275, a response from the payment gateway 130 is received with a notification for the rejection.

Figure 3:
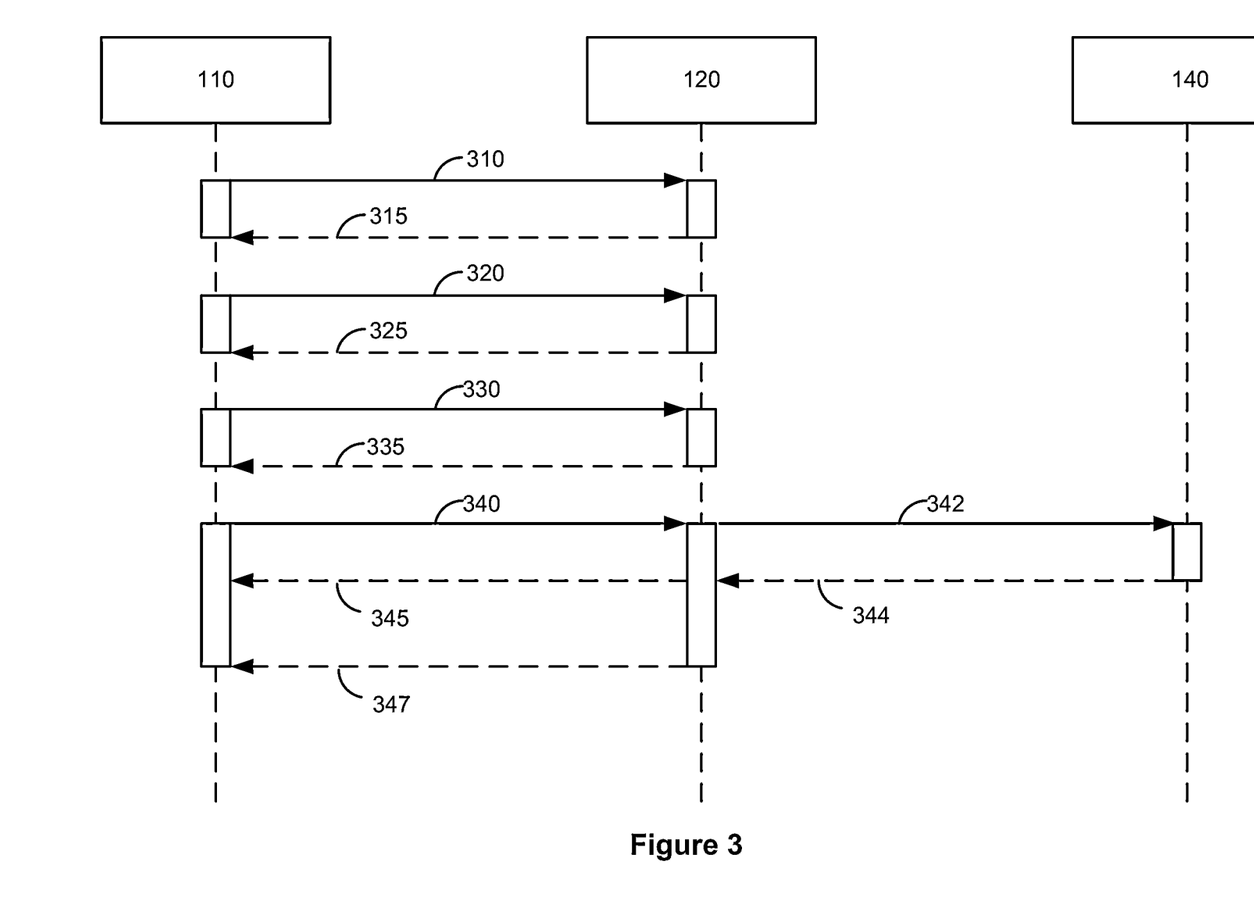
FIG. 3 shows an example sequence diagram regarding the communication between the entities in FIG. 1.

FIG. 3 depicts an example sequence diagram regarding the communication between the entities in FIG. 1 performing secure payment transactions. The entities comprise the client 110, the terminal management server (TMS) 120 and the card processor 140. The payment gateway 130 within the TMS 120 is not depicted for simplicity, being part of the TMS 120 and thus the activities of the payment gateway 130 regarding transmitted massages related to the payment transaction will be referred to as performed by the TMS 120.

Upon initial sign-up 310 by the client 110 to the TMS 120, TMS 120 returns login credentials 315 for the client 110. In one embodiment, the login credentials are provided to the client 110 by means of an SMS message to the mobile communication device, on which the client runs, The attestation request 320 from the client 110 to the TMS 120 comprises a public key part of a public private key pair generated by the client 110, the public key signed with an application certificate. In one embodiment, the attestation request may also include the login credentials and a mobile communication device ID, unique for the mobile communication device on which the client 110 runs. In response to the attestation request 320, TMS sends a device key 325 encrypted with the public key.

Upon each log-in 330 of the client 110 to the TMS 120, TMS returns an authorization session token 335 to be used for the session.

When payment information 340 is sent from the client 110 to the TMS 120, TMS checks the validity of the included tokens and other verifiers of the information and its origin, such as valid encryption/decryption, and forwards the payment information 342 to the card processor 140. The card processor 140 either approves or rejects the payment, which is notified via the response 344 from the card processor 140 to the TMS 120. Then a forwarded response 345 is sent from the TMS to the client, informing the client 110 for the approval/rejection of the payment. Upon approval of the payment, this also triggers updating the last transaction token to be used for a subsequent payment transaction by the client 110. The renewed last transaction token 347 is sent from the TMS to the client 110.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
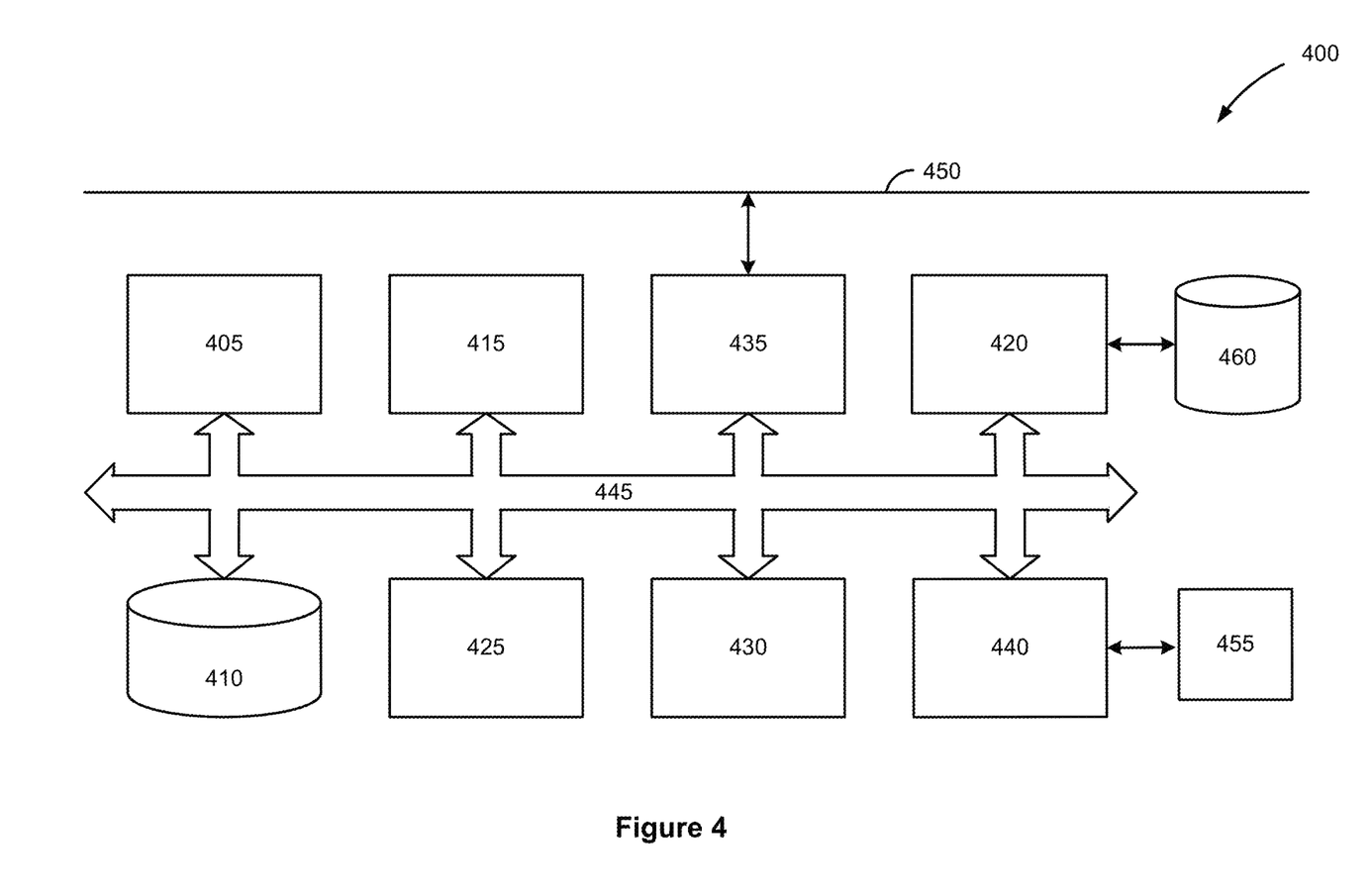
FIG. 4 shows a block diagram of an exemplary computer system.

FIG. 4 is a block diagram of an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450.

The foregoing description, for purposes of explanation, used specific nomenclature to provide a thorough understanding of the invention. However, it will be apparent to one skilled in the art, that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and the equivalents define the scope of the invention.

What is claimed is:
1. A personal mobile communication device comprising:
a secured storage;
a communication interface; and
a processor, the processor runs a client for performing payment transactions on the personal mobile communication device, wherein the client is configured to:
store in the secured storage
a private key, wherein the private key is the private key of a private-public key pair, and
an encrypted device key from a terminal management server in response to an attestation request, wherein the encrypted device key is encrypted using a public key which is the public key of the private-public key pair,
in response to a payment transaction request, reads a contactless card related to the payment request by the communication interface;
send payment information of the payment transaction request to a payment gateway of the terminal management server for processing by a card processor, wherein the payment information comprises, among other information, payment data, contactless card data, an authorization token and a last transaction token, the last transaction token is a token generated during a previous successful transaction, the payment information is encrypted with an unencrypted device key derived from decrypting the encrypted device key using the private key,
if a rejection notification is received from the payment gateway, terminate the payment transaction,
if an approval response is received from the payment gateway when the payment transaction request is approved by the card processor for execution of the payment transaction request, continue to execute the payment transaction, and
receive a renewed last transaction token from the payment gateway, the renewed transaction token replaces the last transaction token, the renewed transaction token serves as the last transaction token for a subsequent payment transaction.

2. The personal mobile communication device of claim 1 wherein the private-public key pair is generated during initial sign-up.

3. The personal mobile communication device of claim 1 wherein the attestation request to the terminal management server comprises the public key signed with an application certificate.

4. The personal mobile communication device of claim 1 wherein the client is configured to delete the payment information after sending to the payment gateway.

5. The personal mobile communication device of claim 1 wherein the client is configured to receive a rejection response from the payment gateway if payment transaction request is rejected by the card processor.

6. The personal mobile communication device of claim 1, wherein the attestation request further comprises a mobile communication device ID and login credentials.

7. The personal mobile communication device of claim 1, wherein the payment information comprises payment data, contactless card data, and an authorization session token received from the management server upon logging in to the management server.

8. The personal mobile communication device of claim 6, wherein the client is further configured to receive one or more PIN certificates from the terminal management server upon attestation and store the one or more PIN certificates in the secure storage.

9. The personal mobile communication device of claim 8, wherein the payment information further comprises a PIN block data, when a transaction amount is beyond a predefined limit, and wherein the PIN block data comprises a PIN associated with the contactless card, the PIN encrypted with a certificate from the one or more PIN certificates respective to an issuer of the contactless card.

10. The personal mobile communication device of claim 1, wherein the communication interface is Near Field Communication.

11. The personal mobile communication device of claim 1, wherein the client is configured to receive an authorization session token from the terminal management server upon logging in.

12. A method for performing payment transactions on a personal mobile communication device comprising:
storing a private key in a secured storage of the personal mobile communication device, wherein the private key is the private key of a private-public key pair;
storing an encrypted device key in the secured storage of the personal mobile communication device, the encrypted device key is from a terminal management server in response to an attestation request, wherein the encrypted device key is encrypted using a public key which is the public key of the private-public key pair;
reading a contactless card used for a payment transaction request in response to the payment transaction request by a communications interface of the personal mobile communication device;
sending, by the personal mobile communication device, payment information of a payment transaction request to a payment gateway of the terminal management server for processing by a card processor, wherein the payment information comprises payment data, contactless card data, an authorization token and a last transaction token, the last transaction token is a token generated during a previous successful transaction, the payment information is encrypted with an unencrypted device key derived from decrypting the encrypted device key using the private key; and terminating the payment transaction if a rejection notification is received from the payment gateway, or
continuing to execute the payment transaction if an approval response is received from the payment gateway when the card processor approves the payment transaction request, and
receiving a renewed last transaction token from the payment gateway, the renewed last transaction token serves as the last transaction token for a subsequent payment transaction request.

13. The method of claim 12 wherein the private-public key pair is generated during initial sign-up.

14. The method of claim 12 comprises sending of claim 1 wherein the attestation request comprises the public key signed with an application certificate.

15. The method of claim 12 comprises deleting the payment information after sending to the payment gateway.

16. The method of claim 12 comprises receiving a rejection response from the payment gateway if the payment transaction request is rejected by the card processor.

17. A method for managing secure payment transactions by a terminal management server comprising:
registering a mobile communication device ID of a personal mobile communication device comprising a client an application for secured payment transactions and login credentials associated with the mobile communication device ID;
generating a device key and sending the device key encrypted with a public key of a public/private key pair (encrypted device key) to the client upon attestation of the mobile communication device;
sending an authorization session token to the client upon logging in by the client;
receiving payment information from the client for a payment transaction request for processing, wherein the payment information comprises payment data, contactless card data, an authorization token and a last transaction token, the last transaction token is a token generated during a previous successful transaction, the payment information is encrypted with the device key after decrypting the encrypted device key using a private key of the public/private key pair;
decrypting the received payment information and checking the received payment information for the authorization session token and a last transaction token;
sending the payment information for processing to a card processor after confirming a match of the authorization session token and last transaction token; and
if receiving a rejection response rejecting the payment transaction, continue by sending the rejection response to the client with a notification to terminate the payment transaction request, or
if receiving an approval response approving the payment transaction request, continue by sending the approval response to the client with a notification to continue executing the payment transaction request, and
generating and sending a renewed last transaction token to the client, the renewed last transaction token serves as the last transaction token for a subsequent payment transaction request from the client.

18. The method of claim 17 comprises:
receiving, by the terminal management server, a rejection response from the card processor if the card processor rejects the payment transaction request; and
sending a rejection response to the client to notify the client of the rejection of the payment request.

19. The method of claim 17 wherein the terminal management server comprises a payment gateway for communicating with the client and the card processor.

20. The method of claim 17 wherein the payment information comprises payment data, contactless card data, the authorization session token and the last transaction token.

\* \* \* \* \*